March 13, 1956
L. D. FITLER
2,737,685
SELF-SEALING TELESCOPIC SPLICE-BOX
Filed Aug. 1, 1952
2 Sheets-Sheet 1
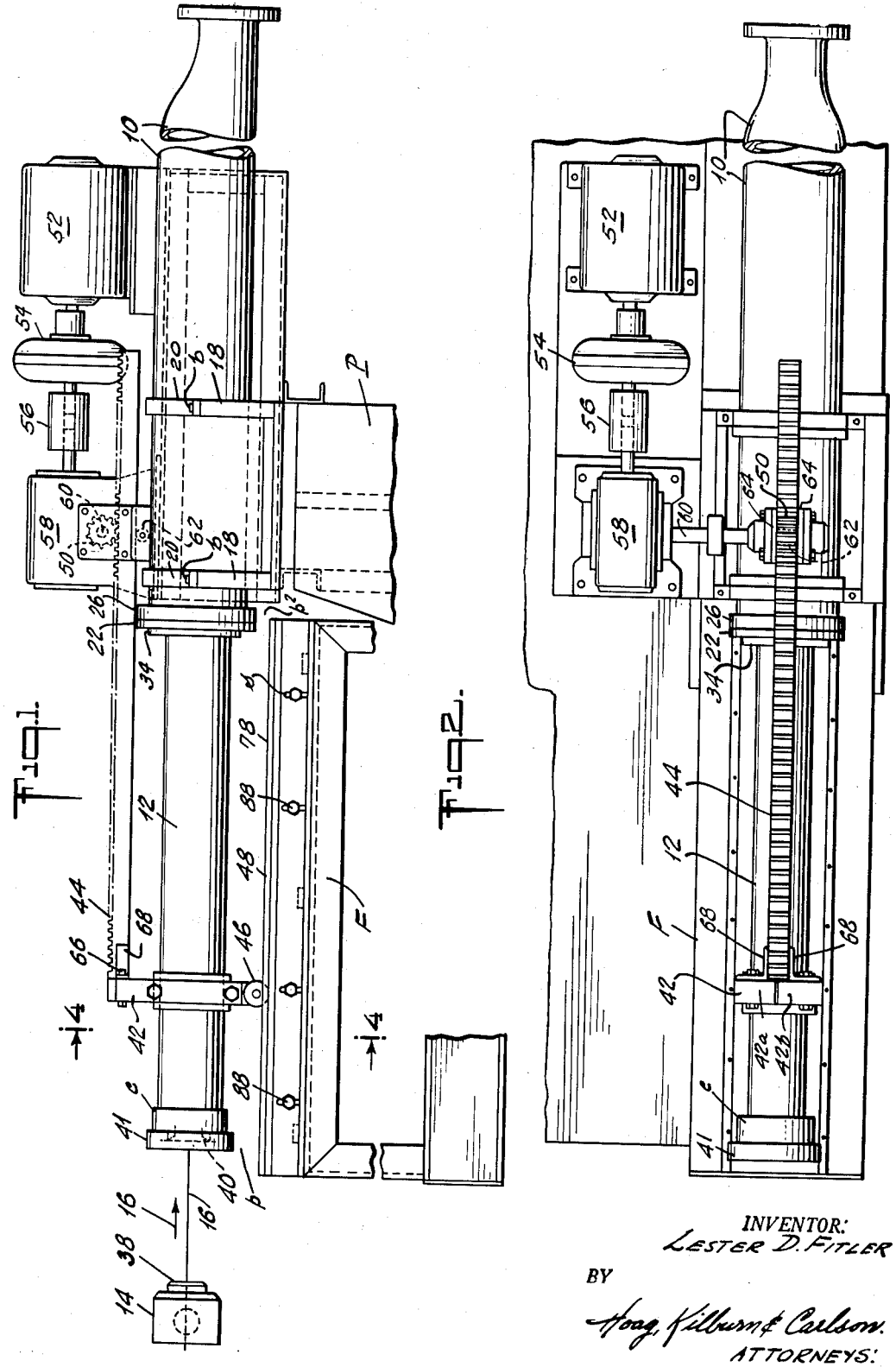
INVENTOR:
LESTER D. FITLER
BY
Hoag, Kilburn & Carlson.
ATTORNEYS.

March 13, 1956 L. D. FITLER 2,737,685
SELF-SEALING TELESCOPIC SPLICE-BOX
Filed Aug. 1, 1952 2 Sheets-Sheet 2
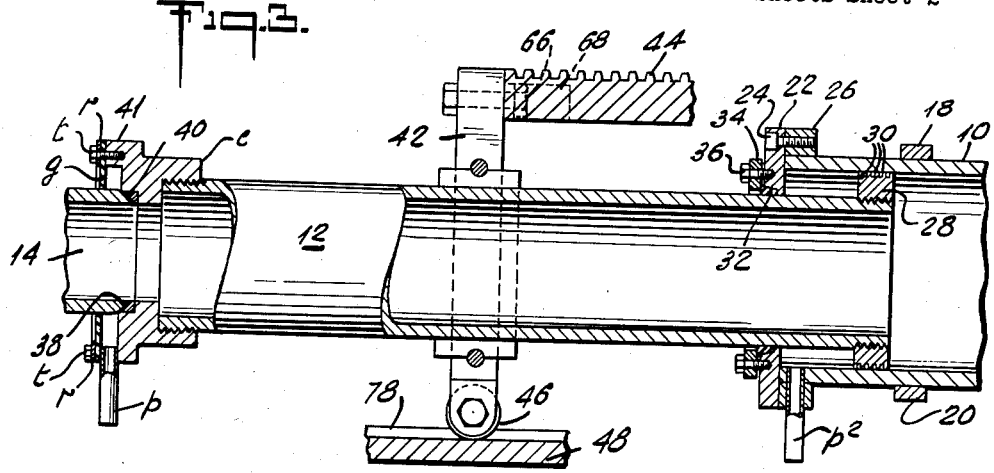
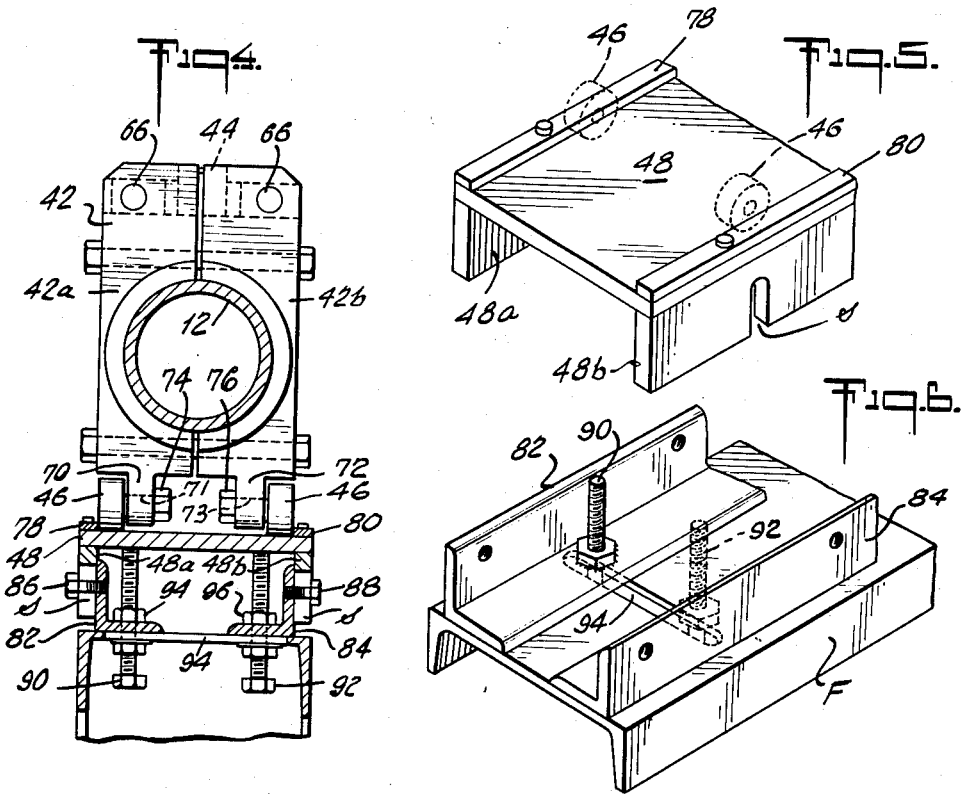
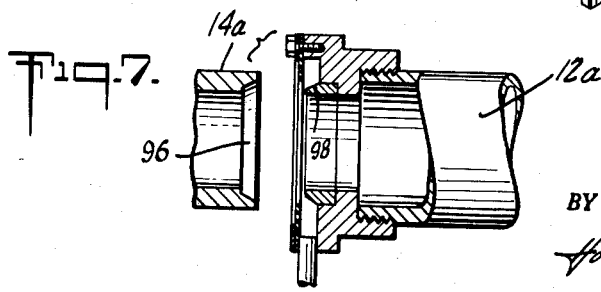
INVENTOR.
LESTER D. FITLER
BY
Hoag, Kilburn & Carlson
ATTORNEYS

United States Patent Office 2,737,685
Patented Mar. 13, 1956

2,737,685
SELF-SEALING TELESCOPIC SPLICE-BOX

Lester D. Fitler, Rome, N. Y., assignor, by mesne assignments, to The Standard Machinery Company, Mystic, Conn., a corporation of Connecticut Application August 1, 1952, Serial No. 302,204

9 Claims. (Cl. 18—6)

This invention relates to closures for high pressure chambers, and more particularly to a splice box construction making it possible to splice wire or cable within a vulcanizing conduit. In such apparatus wire or cable is continuously advanced through an extruder head, in which insulating compound is extruded onto the wire or cable, and through a length of conduit into which steam is admitted under pressure to provide a vulcanizing temperature and to vulcanize the insulation which has been extruded onto the said wire or cable.

In vulcanizing wire or cable it is desirable from time to time to secure the leading end of one length to the trailing end of another length which is already within the vulcanizing conduit. In order to accomplish this it has heretofore been suggested to provide a section of the vulcanizing conduit adjacent the extrusion head which may be moved or "telescoped" into or out of the main body of the vulcanizing conduit by operation of a hand wheel for actuating a pinion meshing with a rack positioned directly on said section or by other power means external to said vulcanizing conduit and section. Great difficulty has been experienced with apparatus depending on the handwheel as the sole meeans for closing the conduit due to the imperfect and unsatisfactory seal provided between the telescopic section and the main body of the vulcanizing conduit on the one hand, and between the telescopic section and the extruder head on the other hand. Steam pressure on the order of 260 lbs. per square inch is admitted into the vulcanizing conduit to achieve satisfactory vulcanizing conditions and with the said apparatus of the prior art there has been constant leakage of steam at both ends of said telescopic section creating a hazard for the operator. In addition such apparatus has been unsatisfactory because it has not enabled the operator to effect a splice and carry on the vulcanizing operation in an efficient manner. Such operation has involved:

1. The exposing of wire ends to be joined by moving the telescopic section away from the extruder head.
2. Effecting the splicing.
3. Starting the extruder which then begins to feed insulation compound.
4. Starting up travel of the wire or cable being insulated.
5. Removing the wad of compound which is first extruded. This compound, having been exposed to room temperature while the conduit was open, has become partially hardened and tends to ball up and form an accumulating mass within the vulcanizer. Even apart from the accumulation, if this wad of insulation compound were not removed it would hang down from the wire or cable into contact with the inner surface of the bottom wall of the vulcanizing conduit and, through friction with the conduit wall, would scuff up, thereby impairing the insulation surface.
6. Closing the vulcanizing conduit as soon as possible by moving the movable section into abutting relation with the extruder head, and locking the section to the extruder head as by tightening of a lock nut to effect a seal.
7. Admitting steam into the vulcanizing conduit as soon as possible, which was determined by the time required to close the conduit section, to start vulcanizing the insulation being extruded from the extrusion head around the travelling wire or cable and end the exposure of the insulating compound to room temperature.

It is desirable to reduce to a minimum the time interval during which the insulation compound is exposed to room temperature. This time interval of course depends on how long it takes to close the telescopic conduit section.

Reliance on compressed air applied on the outside of the conduit section has been suggested, but is undesirable because of the bulk of the device required and because the device would be inoperable if for any reason the supply of compressed air failed.

With the improved apparatus disclosed herein the period of exposure of the insulating compound to rom temperature is reduced to a minimum thereby greatly reducing and substantially eliminating the chance of the insulated compound accumulating within the insulating conduit or forming into a wad and scuffing against the inner wall of the conduit.

An object of the invention is to provide improved splice-box construction.

Another object of the invention is to provide a self-sealing telescopic splice-box.

Another object of the invention is to provide co-acting and self-aligning contact surfaces on said conduit section and said extruder head.

Another object of the invention is to provide a vulcanizing conduit with a telescopic section adapted to co-act with the main body of the conduit to provide an effective seal for high pressure steam and also to act as a piston to utilize the pressure of said steam in effecting and maintaining a seal between said section and an extruder head.

Another object of the invention is to provide such a section with improved adjustable support means.

Another object of the invention is to provide improved method and apparatus for facilitating the splicing of wire or cable within a vulcanizing conduit.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a side elevational view of an embodiment of my invention;

Figure 2 is a plan view of the apparatus shown in Figure 1;

Figure 3 is a side elevation, partly in cross section, of the telescopic vulcanizing section and cooperating structure;

Figure 4 is a vertical section, partly in cross section, taken on the line 4—4 of Figure 1, and showing means for vertical adjustment of the conduit section;

Figure 5 is a fragmentary perspective view of part of the track supporting the telescopic conduit section;

Figure 6 is a perspective view of support means for the track means shown in Figure 5, showing means for laterally adjusting the conduit section; and Figure 7 is a fragmentary plan view, partly in cross section, of a modification of the co-acting surfaces of the extruder head and conduit section.

In the embodiment of the invention shown herein a vulcanizing conduit 10 is shown having at one end a telescopic section 12 which is aligned with an insulation compound extruder head 14. Insulation compound is supplied, by means not shown, through the extruder head 14 and applied therein to a continuously moving wire W, indicated by the arrow 16, which passes from the extruder head directly into telescopic section 12 of the vulcanizing conduit when said section is closed, and through said section into the main body of the vulcanizing conduit 10.

Means are provided externally of the vulcanizing conduit to move the telescopic section 12 toward and away from extruder head 14 and a feature of this invention is the supplementing of this means, after contact of section 12 against the extruder head 14, by utilizing the force of steam, which is supplied to the vulcanizing conduit for raising the temperature within the conduit to approximately 250° F. for vulcanizing the insulating compound applied to the travelling wire within extruder head 14.

Conduit 10 is mounted within support blocks 18 positioned on top of a supporting pillar P. As shown the supporting blocks are trough-shaped to receive the conduit and straps 20 are provided which extend between opposite sides of the members 18 over the top of the conduit, and are secured at their ends to base member 18 by bolts $b$. The end of the main conduit 10 into which the telescopic section 12 is received comprises the annular end plate 22 secured against the end of conduit 10 by the bolts 24 which extend through the annular flange 26 on the outer surface of conduit 10.

The end of telescopic section 12 which is received into conduit 10 has around its periphery adjacent its extremity a labyrinth sealing ring 28 which may be screwed onto the exterior of section 12. It is provided around its periphery with a number of spaced sealing rings 30 which contact the inner surface of main conduit 10. Annular plate 22 is grooved on its outer face to receive the rubber gasket 32 which contacts the outer surface of section 12 and is held in place by ring 34 and the screws 36.

The labyrinth seal member 28, in addition to its sealing function, constitutes a piston which takes the thrust of steam pressure within conduit 10 whereby the energy of the steam is employed to urge section 12 outwardly and into contact with extruder head 14. As shown the extruder head has the annular spherical flange 38 and the end of section 12 adjacent to the extruder head has therein the external spherical flange 40 which, when brought into contact with flange 38 by the force of steam within conduit 10, seats on flange 38 and co-acts therewith to form a steam tight seal. Since the force of the steam not only causes the full seating of flange 40 on flange 38 but also maintains an effective seal the structure is self-sealing.

As shown herein flange 40 is provided within a cup-shaped cap $c$ which is screw threadedly mounted on the end of section 12 and has the projecting annular flange 41 extending beyond the annular flange 40, and secured on said flange 41 is a gasket mat $g$ which may be a ring of rubber or the like and which serves as a low pressure seal around the protruding flange of the extruder head. Said gasket mat $g$ is held in position by the annular retaining ring $r$ and the screws $t$ which extend through the ring and the gasket into the cap $c$. A drain pipe $p$ extends through the wall of the cup-shaped member into the recess within flange 41 to drain off any water which may condense therein from steam entering said recess from section 12.

Drainage pipe $p^2$ is provided extending through the extremity of conduit 10 to drain off water condensing from any steam seeping by labyrinth seal 28 into the space between the end plate 22 and the labyrinth seal 28.

To insure that section 12 is aligned with extruder head 14, and to prevent sagging, section 12 is supported in the split block 42 (see Figure 4). Split block 42 depends from the rack 44, and is in turn supported upon rollers 46 which travel on a vertically and laterally adjustable track 48. Rack 44 meshes with a pinion 50 which is driven by a suitable source of power shown herein as motor 52, the drive from which goes through coupling devices 54 and 56 and the speed reducer 58 and shaft 60, extending at right angles from member 58, see Figure 2, on which the pinion is mounted. Adjacent its rear end the rack rests on the supporting roller 62 extending between the vertical guides 64.

As shown in Figure 4 the block 42 comprises the two halves 42$^a$ and 42$^b$ the upper ends of which are secured by bolts 66 to the angle brackets 68 which are welded to the respective sides of rack 44. Depending from the lower ends of the block halves are the bearing lugs 70 and 72 respectively, on which the rollers 46 are mounted on studs 71 and 73 held in place by nuts 74 and 76 respectively. As mentioned above rollers 46 travel on track 48 and along the lateral edges of track 48 the members 78 and 80 are provided defining the lateral limits of the track.

Track 48 is supported by the angle members 82 and 84 which in turn rest upon the supporting frame F. As shown the angle members 82 and 84 are engaged, by means of the bolts 86 and 88 respectively, with the flanges 48$^a$ and 48$^b$ depending from track 48 and having the vertical slots $s$ permitting track 48 to be raised and lowered by adjustment of the adjustable bolts 90 and 92 which extend vertically through the top of frame F, the angle members 82 and 84, and the nuts 94 and 96 which are welded on top of the horizontal arms of the brackets 82 and 84 respectively. Member 48 rests upon the upper ends of said bolts 90 and 92 and is therefore raised and lowered as said bolts are raised and lowered.

Extending laterally across the top of the frame F is a slot 94 through which bolts 90 and 92 extend, permitting the bracket members 82 and 84 to be adjusted in position laterally of the top of frame member F, see Figure 6. Thus the support means for the section 12 may be adjusted either vertically or laterally to insure that said section is aligned at all times with the extruder head 14.

In Figure 7 a modification is shown of the mating surfaces of the extruder head and the telescopic section of the vulcanizing conduit. As shown in Figure 7 projecting annular flange 96 of extruder head 14$^a$ is inwardly tapered to mate with the outwardly tapered flange 98 provided within the annular cap forming the end of telescopic section 12$^a$.

It will be understood that conduit section 12 could be moved to open position after the steam supply to conduit 10 is cut off, and moved into substantially closed but not sealed position, by hand. The final and most important sealing step is performed by steam introduced into the vulcanizing conduit acting on member 28 which functions both as a labyrinth seal and as a piston taking the thrust of the steam pressure.

In practice the motor 52, which may be operated by known push button control means not shown, is employed to move the conduit section to open position after the steam supply to conduit 10 is shut off, and to move the conduit section 12 into contact with the extruder head before the steam is turned on. The force of the steam acting on member 28 then completes the sealing and acts to maintain an effective seal as long as steam continues to be supplied into conduit 10.

The method employed is thus both simple and economical since the steam employed is available without extra cost and is conserved. Actually less steam is lost than in prior art methods since an effective seal preventing escape of steam is effected more quickly. And the apparatus employed is simple and dependable and may be readily adjusted to maintain at all times the alignment of the section 12 and the extruder head 14.

It will thus be seen that there has been provided by this invention a method and apparatus in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. In a conduit for vulcanizing insulation on a continuously travelling wire, a section of conduit mounted for movement longitudinally of said conduit between said conduit and an extrusion head, said section having a reduced diameter permitting it to be moved into and out of the main body of said conduit, a rack attached to and movable with said section, a pinion engaging said rack, means for driving said pinion to move said rack and section, and piston ring means surrounding said section and serving as a piston against which the pressure of said steam acts to maintain a seal between said section and said extruder head after said section has been closed and steam admitted into said main body of the conduit.

2. In a conduit for vulcanizing insulation on a continuously travelling wire, a section of conduit mounted for movement longitudinally of said conduit between said conduit and an extrusion head, said section having a reduced diameter permitting it to be moved into and out of the main body of said conduit, a rack attached to and movable with said section, a pinion engaging said rack, means for driving said pinion to move said rack and section, piston ring means surrounding said section and serving as a piston against which the pressure of said steam acts to maintain a seal between said section and said extruder head after said section has been closed and steam admitted into said main body of the conduit, and means for supporting the forward end of said section to maintain it in alignment with said extruder head, including, a track, means connected to said section and movable along said track, and means for adjusting the position of said track both vertically and horizontally.

3. In a conduit for vulcanizing insulation on a continuously travelling wire, a section of conduit mounted for movement longitudinally of said conduit between said conduit and an extrusion head, said section having a reduced diameter permitting it to be moved into and out of the main body of said conduit, a rack attached to and movable with said section, a pinion engaging said rack, means for driving said pinion to move said rack and section, and piston ring means surrounding said section and serving as a piston against which the pressure of said steam acts to maintain a seal between said section and said extruder head after said section has been closed and steam admitted into said main body of the conduit, and means for adjustably supporting the forward end of said section in alignment with said extruder head including a track, means connected to said section and movable along said track, a base having a transverse slot, track supporting brackets on said base, bolts extending through said slot and through said brackets respectively and adjustable in position along said slot to adjust the position of said brackets laterally along said base, said bolts being also adjustable in height relative to said base to adjust the height of said track relatively to said base.

4. In combination an extruder head having an annular projecting flange, a vulcanizing conduit axially aligned with said flange but spaced therefrom, a conduit section telescopically mounted in said vulcanizing conduit, means for projecting said section from, or withdrawing it into, said conduit, said section having a contact nose at its forward end adapted to mate with said flange projecting toward it from said extruder head, and having means at its rear end serving both as sealing means, coacting with the wall of said conduit to effect a seal, and as a piston to receive the thrust of steam pressure within said conduit, the seal between the nose of said section and the flange on the extruder head being completed and maintained by the force of steam pressure within said conduit acting on said means on the rear end of said section.

5. In combination an extruder head, a vulcanizing conduit axially aligned with said extruder head but spaced therefrom, a conduit section telescopically mounted in said vulcanizing conduit, means for projecting said section from, or withdrawing it into, said conduit, mating means carried by said extruder head and by said section respectively coacting one with the other to provide a seal between the extruder head and said section when said section has been projected into contact with the said extruder head, said section having means at its rear end serving both as sealing means, coacting with the wall of said conduit to effect a seal, and as a piston to receive the thrust of steam pressure within said conduit, the seal between said extruder head and said section being completed and maintained by the force of steam within said conduit acting on said means on the rear end of said section.

6. The device claimed in claim 5 including support means for said section and means for adjusting the position of said support means vertically with respect to the axis of said section.

7. The device claimed in claim 5 including support means for said section and means for adjusting the position of said section laterally with respect to the axis of said section.

8. In the device claimed in claim 5 support means for said section including a track, a base, means connected to said section and movable along said track, said base including portions movable laterally with respect to said track to adjust the position of said track.

9. In the device claimed in claim 5 support means for said section including a track, a base, means connected to said section and movable along said track, said base including portions adjustable in height to adjust the height of said track relatively to said base.

References Cited in the file of this patent

UNITED STATES PATENTS

| | | |
|---|---|---|
| 943,904 | Struer | Dec. 21, 1909 |
| 1,707,312 | McDaniel | Apr. 2, 1929 |
| 1,813,179 | Lodge | July 7, 1931 |
| 2,438,003 | Edwards et al. | Mar. 16, 1948 |
| 2,533,923 | Edwards et al. | Dec. 12, 1950 |